Aug. 14, 1962     E. A. SMITH     3,049,160
NUT CRACKER
Filed Sept. 14, 1960
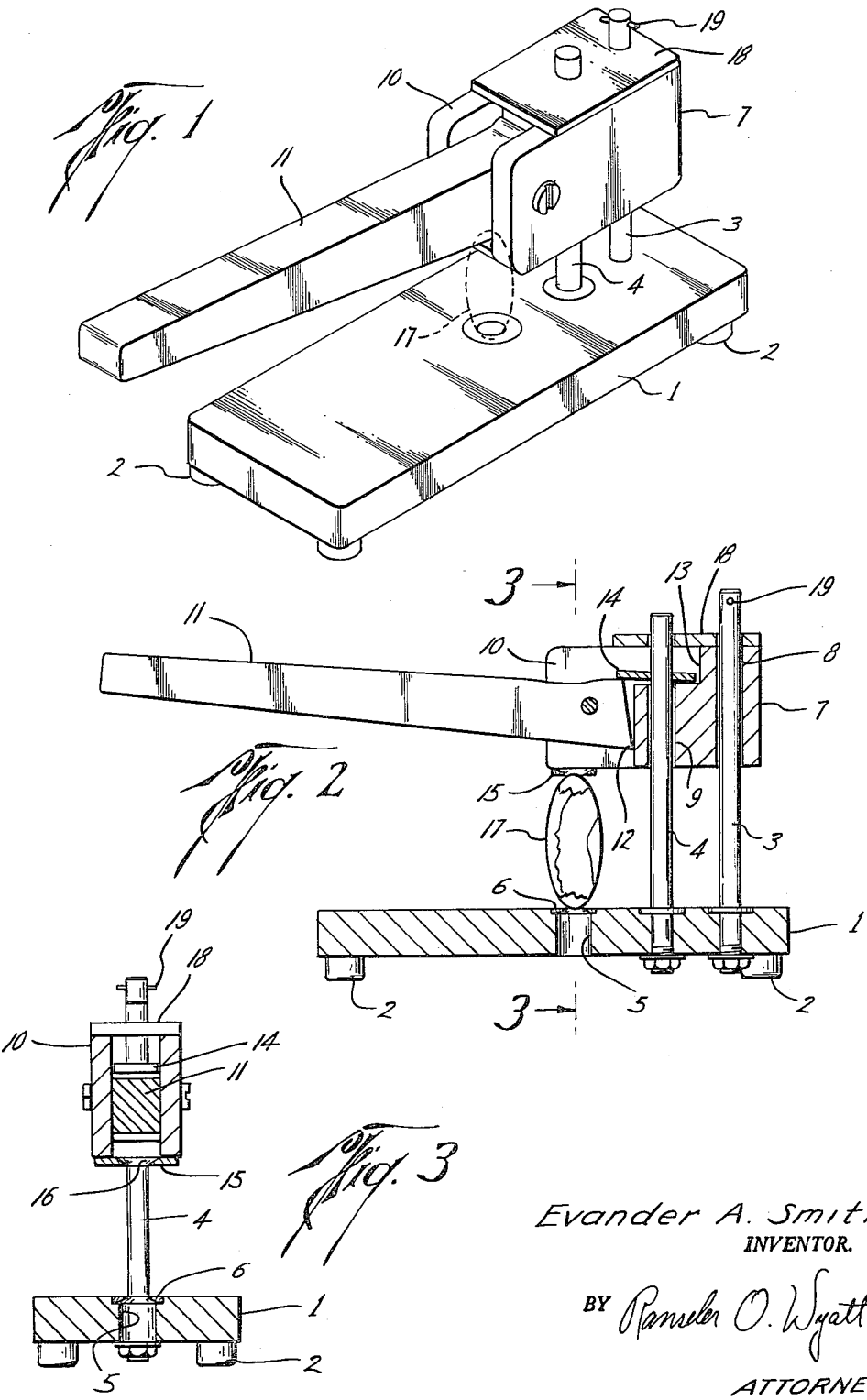
Evander A. Smith
INVENTOR.
BY Ransler O. Wyatt
ATTORNEY

United States Patent Office 3,049,160
Patented Aug. 14, 1962

3,049,160
NUT CRACKER
Evander A. Smith, Houston, Tex., assignor to Charles F. Phelps and W. T. Spigener, Houston, Tex.
Filed Sept. 14, 1960, Ser. No. 55,937
2 Claims. (Cl. 146—15)

This invention relates to new and useful improvements in a nut cracker.

It is an object of this invention to provide a device for cracking the shells of nuts, such as pecans, so that the meat may be retained in an unbroken state.

It is another object of the invention to provide a nut cracking device having novel means for breaking the shell of a nut by applying pressure thereto, having means for limiting the pressure applied so that the meat will be unbroken.

It is still a further object of the invention to provide a nut cracking device having means for cutting the ends out of a nut to be shelled and applying pressure to the shell to cause it to break.

It is still a further object of the invention to provide a device for cracking the shells of nuts having novel means for applying graduated pressure to a nut to be shelled.

With the above and other objects in view, the invention has relation to certain novel features of construction, operation and arrangement of parts more particularly defined in the following specification and illustrated in the accompanying drawings, wherein:

FIGURE 1 is a perspective elevational view of the device.

FIGURE 2 is a side elevational view, in cross section, and

FIGURE 3 is a cross sectional end view taken on the line 3—3 of FIGURE 2.

Referring now more particularly to the drawings, the numeral 1 designates a base member having suitable feet as 2, 2. A guide member, such as the post 3, is mounted in the base member 1 and extends upwardly therethrough adjacent one end of the base member 1. A post 4 is similarly mounted in the base member 1 in longitudinal alignment with the guide post 3 and a vertical port 5 is formed in the base member 1 in longitudinal alignment with the post 4. A cutter 6 is formed in any suitable manner, such as by beveling the side wall of the port of a metal washer so that the side wall tapers upwardly and inwardly, is mounted in the upper end of the passageway 5.

A traveling block 7 is provided with vertical ports 8, 9 to receive the guide post 3 and post 4, respectively. The block 7 has the longitudinally extended side members 10, 10 between which is pivotally mounted the actuating lever 11. The lever 11 has one end tapered outwardly as 12 to provide a stop for the downward movement of the extended end of the lever 11. The block 7 has a chamber 13 formed therein to receive the traveling plate 14 which is provided with a port through which the post 4 extends.

Mounted on the lower portion of the block 7 is the cutter 15, which may be formed of a block of metal with the port 16 having downwardly tapered side walls. A suitable cover as 18 may be mounted on said block 7 and a stop as 19 is mounted in the guide 3 to limit upward movement of the block 7.

A nut to be shelled is placed on the base member with one end seated in the cutter 6 and the traveling block 7 is manually lifted to seat the cutter 15 on the other end of the nut, the lever 11 being raised to vertical position to permit the traveling plate 14 to move freely on the post 4. The lever 11 is then lowered and the end of the lever 11 which extends beneath the plate 14 will exert upward pressure on the one end of the plate 14, causing the other end of the plate 14 to bear against the block 7, applying downward pressure to the nut seated in the cutters 6, 15. The downward movement of the lever 11 is limited by the stop 12 bearing against the block 7, so that only sufficient pressure will be applied to the nut, as 17, to cut the ends out of the nut and to break the shell. The initial downward movement of the block causes the cutters 6, 15 to cut through the shell of the nut, and the continued downward pressure against the shell, causes the shell to break.

If it is desired to break the meat of the nut, as for preparing nuts for cakes and the like, the lever may again be raised and lowered, each time the lever is raised, the plate 14 will drop down on the post until stopped by the nut seated in the cutters and upon again lowering the lever 11, the nut will be again subjected to pressure and again be broken.

As is obvious, the device will be effective for cracking the shell of any size of nut, as the block 7 need be raised only enough to permit the nut to be cracked to be seated in the cutters. While oblong nuts, such as pecans, are best suited to this particular device, any nut may be shelled by seating same in the cutters and applying pressure to the lever 11, to cut and break the shell as above described.

While the foregoing is considered a preferred form of the invention, it is by way of illustration only, the broad principle of the invention being defined by the appended claims.

What I claim is:

1. In a nut cracking device, a base member, upstanding posts mounted on said base member, said base member having a vertical port therethrough and a rigid cutter mounted in the upper end of said port, said cutter having an axial passageway therethrough, the side walls of said passageway being tapered upwardly and inwardly, a traveling block mounted on said posts, a rigid traveling plate loosely mounted on one of said posts, a lever pivotally mounted on said block, one end of said lever extending beneath one end of said plate, a rigid cutter mounted on said block in vertical alignment with said cutter mounted on said base member, said cutter mounted on said block having a passageway therethrough, the side walls of said passageway being tapered downwardly and inwardly.

2. In a nut cracking device, a base member, upstanding posts mounted on said base member, said base member having a vertical port therethrough and a rigid cutter mounted in the upper end of said port, said cutter having an axial passageway therethrough, the side walls of said passageway being tapered upwardly and inwardly, a traveling block mounted on said posts, a rigid traveling plate loosely mounted on one of said posts, a lever pivotally mounted on said block, one end of said lever extending beneath one end of said plate, a rigid cutter mounted on said block in vertical alignment with said cutter mounted on said base member, said cutter mounted on said block having a passageway therethrough, the side walls of said passageway being tapered downwardly and inwardly and means for limiting the downward movement of said lever.

References Cited in the file of this patent
UNITED STATES PATENTS

| | | |
|---|---|---|
| 1,117,726 | Varga | Nov. 17, 1914 |
| 1,219,830 | Marsh | Mar. 20, 1917 |
| 1,227,570 | Black | May 29, 1917 |
| 2,474,591 | Murph | June 28, 1949 |